United States Patent
Bethune

(10) Patent No.: US 7,527,843 B2
(45) Date of Patent: May 5, 2009

(54) SUPPORT PROVIDED WITH TWO SERIES OF LABELS

(75) Inventor: Alain Bethune, Savigny (FR)

(73) Assignee: L'Oreal, Paris (FR)

( * ) Notice: Subject to any disclaimer, the term of this patent is extended or adjusted under 35 U.S.C. 154(b) by 302 days.

(21) Appl. No.: 11/116,374

(22) Filed: Apr. 28, 2005

(65) Prior Publication Data

US 2005/0255276 A1    Nov. 17, 2005

Related U.S. Application Data

(60) Provisional application No. 60/570,474, filed on May 13, 2004.

(30) Foreign Application Priority Data

Apr. 28, 2004 (FR) .................................. 04 50812

(51) Int. Cl.
*B32B 9/00* (2006.01)
*B32B 33/00* (2006.01)
*G09F 3/00* (2006.01)

(52) U.S. Cl. .................... 428/40.1; 428/42.2; 428/42.3; 428/43; 428/354; 283/81

(58) Field of Classification Search ............... 428/40.1, 428/41.3, 41.5, 41.9, 42.1, 42.2, 42.3, 354, 428/914, 41.8, 44, 45, 906, 43; 283/81
See application file for complete search history.

(56) References Cited

U.S. PATENT DOCUMENTS

| 4,876,131 | A | * | 10/1989 | Ashby et al. ............... 428/42.3 |
| 5,143,466 | A | * | 9/1992 | Moncrieff Baldwin et al. ......................... 402/79 |
| 5,846,624 | A | | 12/1998 | Denklau et al. |
| 6,503,619 | B1 | * | 1/2003 | Neal et al. ................... 428/343 |
| 7,220,333 | B1 | * | 5/2007 | Bethune et al. ............. 156/234 |
| 2007/0252379 | A1 | | 11/2007 | Bethune et al. |

FOREIGN PATENT DOCUMENTS

| DE | 2 212 995 | 9/1973 |
| FR | 2 789 971 | 8/2000 |
| FR | 2 789 972 | 8/2000 |
| GB | 2 295 138 | 5/1996 |
| JP | 6-33173 | 4/1994 |
| JP | 2000-247319 | 9/2000 |
| JP | 2001-179857 | 7/2001 |
| JP | 2001-269895 | 10/2001 |
| JP | 2001-302995 | 10/2001 |
| JP | 2002-6746 | 1/2002 |

* cited by examiner

*Primary Examiner*—Patricia L Nordmeyer
(74) *Attorney, Agent, or Firm*—Oblon, Spivak, McClelland, Maier & Neustadt, P.C.

(57) ABSTRACT

A support for labels includes a support tape provided on each of its two faces with first and second series of removable adhesive labels respectively. The labels of at least one of the first and second series include at least two layers of different coextruded materials. A method of forming the support is also provided, as well as a method of applying the labels.

37 Claims, 2 Drawing Sheets

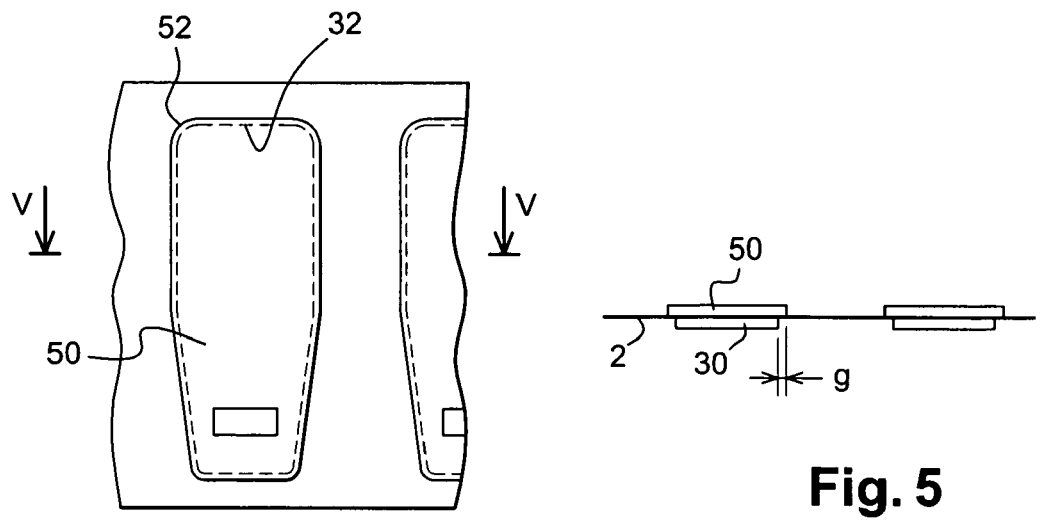
Fig. 4
Fig. 5
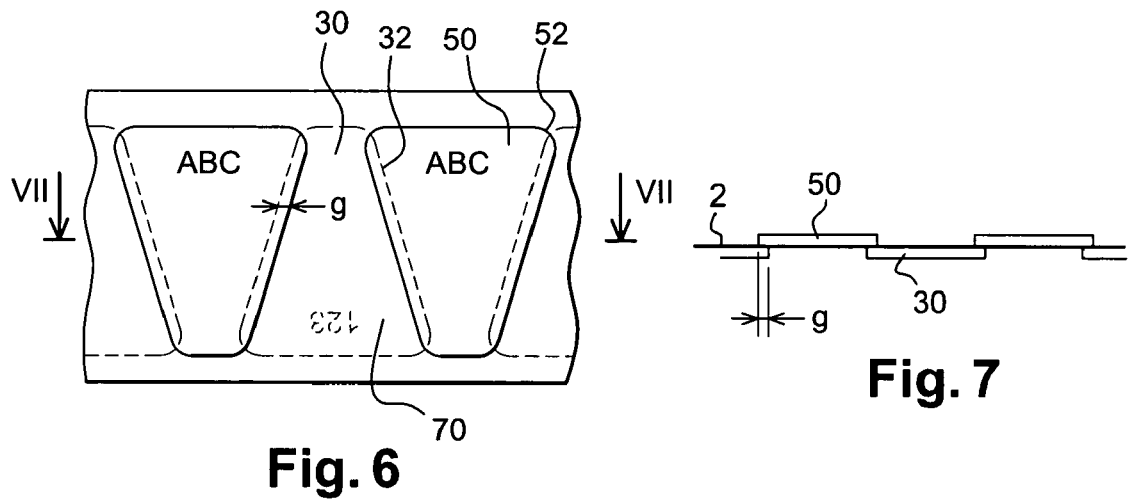
Fig. 6
Fig. 7
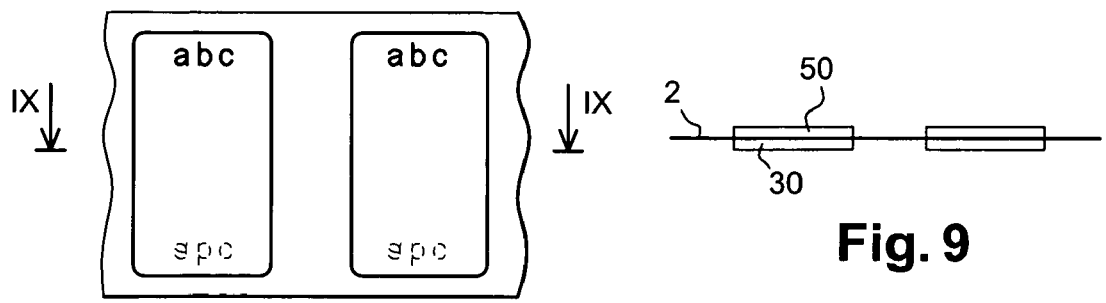
Fig. 8
Fig. 9

SUPPORT PROVIDED WITH TWO SERIES OF LABELS

CROSS-REFERENCE TO RELATED APPLICATIONS

This document claims priority to French Application Number 04 50812, filed Apr. 28, 2004 and U.S. Provisional Application No. 60/570,474, filed May 13, 2004, the entire contents of which are hereby incorporated by reference.

FIELD OF THE INVENTION

The present invention provides a support for adhesive labels to be adhesively bonded to bottles or other containers, such as those used in fields as varied as the cosmetic, pharmaceutical, domestic and agri-foodstuff fields, or the motor vehicle industry. The invention can be particularly advantageous for bottles such as those used for packaging shampoos, lotions, beauty care creams or gels, and can be particularly advantageous for containers of products used for washing.

BACKGROUND OF THE INVENTION

Discussion of Background

Conventionally, the labels used in the cosmetics field are formed from self-adhesive sheets made of materials such as high-density polyethylenes, polypropylenes, polyvinyl chlorides, polyethylene terephthalates, or paper. The face of the sheet on the opposite side from the adhesive layer is printed, such as by screen printing, typography, flexography, photogravure or offset printing. A lacquer is optionally deposited on the printed face and dried, conventionally or by ultraviolet radiation.

Generally, in the labeling field, the labels are placed on at least one of the faces of a support tape wound around a core. The support is continuously fed to a labeling station at which the labels are transferred onto objects to be labeled. On leaving the labeling station, the support is wound around a spindle, and scrapped or recycled.

Supports provided with labels on both their faces are also known. These can be used for feeding continuous labeling chains as described in documents FR-A-2 789 971 and FR-A-2 789 972. These two-sided label supports have the advantage of minimizing the amount of support tape to be subsequently scrapped or recycled once all the labels have been removed.

Supports provided with labels made of polyethylene, the thickness of the labels of which is around 80 to 100 μm, are known.

Also known from the prior art are thin labels made of polyethylene terephthalate that are bonded by means of an adhesive layer to both faces of a paper support or a support made of a thermoplastic. The faces of the support are preferably siliconized in order to facilitate the detachment of the labels coated with their adhesive by the labeling stations. The thickness of such a support provided with labels on both its faces is known to be around 60 to 150 μm.

The advantage of polyethylene terephthalate labels is the ability to obviate treatments prior to the printing, of the corona or "top coating" type, that are used to improve the printability and the retention of the ink on the upper surface of the label. This is because polyethylene terephthalate already allows, without any specific treatment, more optimum and durable printability.

The problem posed by the two-sided supports of the prior art is that they are too thick when they have polyethylene labels and they are expensive to produce when they have polyethylene terephthalate labels. The recycling of polyethylene terephthalate is also generally more expensive than the recycling of other thermoplastics.

Finally, the inventor is aware that the problems associated with the high level of products deemed to be defective on leaving the labeling station, and the problems of the labeling stations slowing down or becoming blocked, can be due to the electrostatic potential developed by these polyethylene terephthalate labels. Thus, when the labeling station unwinds the support, it may turn out that the electrostatic potential of the labels is sufficient to generate a static electricity spark on passing through the labeling station. This spark can result in the ignition of the support or the labels. Such ignition then makes, respectively, the labels and the support unsuitable for use. The labeling station therefore has to be stopped.

Even if the label passes through the labeling station without creating sparks, since the label still has a high electrostatic potential when it is mechanically presented against the object onto which it has to be bonded, it can be repelled by the object. A first risk is that the label will completely fail to be bonded to the product. A second risk is that the label will be bonded to the object in an offset manner. In the latter case, the label will not be at an expected place on the object. In both situations, the resulting objects can be considered defective and unsuitable for sale as such. It will therefore be necessary for these objects to be removed manually, and the production costs will thereby be increased.

The existence of such an electrostatic field may also block the upstream labeling station. This is because the electrostatic field created between two labels facing each other may even be higher than the adhesive force conferred by the adhesive that keeps the labels on their support. Consequently, a label may become prematurely separated from its support—it is then free and can "fly" in the labeling station. There is therefore a risk of it disturbing or even blocking or jamming the labeling chain, and time will then be unnecessarily wasted in getting the labeling machine back into operation.

SUMMARY OF THE INVENTION

It is an object of the invention to solve at least one of the abovementioned problems and/or to limit or reduce one or more of the problems associated with the high electrostatic potential developed by the labels when they are being paid out in the labeling stations.

According to one aspect, the invention provides a support for labels, which comprises a support tape provided on each of its two faces with first and second series of removable adhesive labels respectively. According to a preferred example, the labels of at least one of the first and second series include at least two layers of different coextruded materials.

Advantageously, the labels are retained by means of an adhesive layer on the faces of the support tape.

Also advantageously in accordance with one example, the labels of the first and second series can each include, respectively, at least two layers of different coextruded materials.

By way of example, a label according to the invention can be obtained by coextruding at least two layers of different materials. The electrostatic potential on the upper surface of the label, on the opposite side from the lower surface of the label which is affixed to the support and is then later affixed to an object, is dependent on the material and on the thickness of the layers defining the label. Since the layers of the label are coextruded, they can be produced with a small thickness but nevertheless they are well bonded together. Preferably, the upper layer of the label, which defines this upper surface, has a small thickness relative to the total thickness of the label. With this arrangement, the electrostatic potential measured on this upper surface is in fact substantially less than the electrostatic potential of the labels of the prior art.

Advantageously, the materials are preferably chosen from the family of polyolefins. They may thus be coextruded in such a way that the layers are bonded together directly, without the presence of a tie layer between them. By coextruding them, the materials of the various layers are brought into contact with one another in a molten or at least partially molten state so as to create physico-chemical bonds, so that the two materials adhere to each other after or upon cooling. Thus, the mutual cohesion of the layers is de facto ensured, as is the integrity of the label.

As a variant, the at least two layers may be produced from compounds that belong to the same chemical family and are mutually compatible from a physico-chemical standpoint so as to adhere well to one another. Also advantageously, the chemical family may also be chosen from one of the chemical families of the following thermoplastic polymers: the family of polyvinyl chlorides and their derivatives; the styrene polymer family; the polyamide family; the saturated polyester family; the polycarbonate family; and the cellulose family. By being chosen from the same family, the recyclability of the coextrudate, although a multilayer, can be more convenient. In general, the coextrudate is preferably recycled in the form of its (or based upon the) component predominantly present in the label.

By way of example, the coextrusion of the various layers may take place with or without the uniaxial or biaxial orientation of the constituent materials of these layers. The uniaxially oriented or biaxially oriented coextrusion of the various layers improves the directional and dimensional stability of the coextrudate, especially when it is subjected to tensile stresses. A layer is generally considered to have a uniaxial orientation when it is extruded and stretched in a lengthwise direction but not widthwise. A layer is considered to be bioriented or have a biaxial orientation where it is stretched in two directions such as in a lengthwise direction and a widthwise direction (e.g., stretching to increase the length and subjected to a blowing process to stretch in a direction perpendicular to the lengthwise direction). By way of example, bioriented layers made of polypropylene are also called oriented polypropylene or an oPP layer. Now, in order to subsequently print the labels, the support is generally tensioned in order to make it pass through the printing machine. To improve the mechanical stability of the support, at least one of the layers, and preferably all the layers, of the coextrudate undergo oriented coextrusion, with both layers preferably bioriented or stretched in both lengthwise and widthwise directions. Thus, for printing having at least two different indicia to be applied in succession at the same point or region on the tape intended to form the labels, the risk of offset between these indicia is substantially reduced. By forming labels with bioriented layers, the labels better maintain their shape (preferably planar) even when detached from the support, and they have less tendency to wrap upon themselves. Thus, it is also easier to handle the labels and position them properly on an object or product.

By way of example, one of the layers of the label can be obtained by extruding polyethylene, in particular a low-density polyethylene. Also as an example, another of the layers of the label can be obtained by extruding polypropylene.

According to an example of a first embodiment, the label can include two layers one made of polyethylene, preferably low-density polyethylene, and the other made of polypropylene. In this case, at least the polypropylene layer may be oriented. Preferably, the two layers, respectively polyethylene and polypropylene, are oriented. In this case, the polyethylene layer will preferably be chosen to form the visible upper surface when the label is affixed to an object, since this polyethylene layer exhibits good impermeability and good stability in contact with oxygen and air. Moreover, after a simple surface treatment, a polyethylene layer can be durably printed. This is because the surface tension of a polyethylene layer is, by way of example, around 31 to 32 dynes/cm ($10^{-7}$ N/m) and after treatment, for example of the corona type, the surface tension increases to between 35 and 36 dynes/cm, resulting in a difference of greater than 8 dynes/cm with the surface tension of the inks generally used for printing these labels. A polyethylene layer is therefore correctly printed, with no flash, and adhesion of the printed ink is more optimally achieved.

Finally, the polyethylene layer can enhance the barrier effect already provided by the wall of the container to which the label is affixed. This arrangement can be advantageous for containers intended to contain sun cream or hair care products, which are subjected to high physico-chemical stresses. However, the stiffness of this polyethylene layer is relatively low as it is between 0.3 and 1.5 gigapascals.

The polypropylene layer has the advantage of having a high stiffness, of around 0.9 to 2 gigapascals. The polypropylene layer makes it easier for the label to be pulled off its support and subsequently handled to be deposited on an object.

The lower layer of the label, for example made of polypropylene, is intended to be brought into contact with an adhesive layer in order to be retained on the face of the support tape and subsequently to be retained on an object to be decorated. The adhesive layer has a thickness, for example, of between 15 and 18 μm.

By way of example, the label can preferably have a thickness of less than 65 μm and preferably around 62 μm. This thickness corresponds to at least the sum of the thicknesses of the various layers constituting the label. The label may be transparent, particularly due to this small thickness.

When the label is formed from two layers, the first layer being made of polypropylene and the second layer of polyethylene, the thickness of the first layer is preferably greater than the thickness of the second layer, with the total thickness preferably being chosen to be minimal. By way of example, the first layer can have a thickness of about 50 μm and the second layer can have a thickness of about 12 μm. Because of the high proportion of polypropylene, overall transparency of the label can be achieved or improved.

As a variant, these at least two layers may be bonded together by means of a tie or bonding layer or material coextruded simultaneously between the two layers. This can be advantageous if the two layers are not capable of forming good chemical bonds directly between them.

Advantageously by way of example, the support tape is made of a material, preferably paper or thermoplastic, and the two faces of the support are preferably coated with a silicone layer, for example about 1 μm in thickness. Thus, it is easier to pull the labels off the support. For example, the support tape can be made of polyethylene terephthalate. The support tape can have, by way of example, in this case a thickness of between 10 and 40 μm, and preferably between 23 and 36 μm. As a variant, the support tape may also be made of polypropylene, and in this case it preferably has, by way of example, a thickness of around 50 μm.

The two faces of the support tape are opposed or on opposite sides thereof.

If the support tape has labels on both its faces, the labels of the first face may be arranged so as to form a first series of labels, which are generally identical and uniformly spaced apart. In addition, the labels placed in a second series on the second face can be, for example, respectively centered on an axial space separating two adjacent labels of the first series of labels. Alternatively, the labels of the first series can be centered on the labels of the second series.

Again as a variant, the labels of the first series may be identical to the labels of the second series. Alternatively, the labels of the first series may be different from the labels of the second series, for example they can have a different outline profile, or they might vary only as regards the content printed on these respective labels.

For example, the labels of the first series can have an outline homothetic with the outline of the labels of the second series. For example, the outline of each label of the first series may lie inside the outline of each label of the second series.

The invention also provides a process for manufacturing a support provided with labels from a support tape and from first and second films intended to be bonded to one or both of the opposed faces of the support tape. The first and second films are obtained by coextrusion of at least two layers of different materials, such that the films are respectively retained on the faces of the support tape by an adhesive layer. The films can then be cut so as to define, respectively, the series of labels on each of the faces of this support tape.

Advantageously, and by way of example, at least one of the external surfaces of the films is treated by a corona treatment in order to improve the printability of the labels.

According to one advantageous embodiment, by way of example, the second film is temporarily separated from the support tape during the operation of cutting the first film in order to form the first series of labels. As a result, the labels located on one side of the support tape can be cut with a lower risk of nicking the support tape, of insufficiently cutting their perimeter, or of causing the adhesive to flow, since the total thickness present between the cutting tool and the corresponding backing tool is reduced due to the absence of the second film at this moment. The temporary separation of the second film may be effected, for example, by means of rollers having a non-stick surface.

For example, the second film can be cut in such a way that the outline of each label of the first series is identical to the outline of each label of the second series.

As a variant, the second film may be cut in such a way that the outline of each label of the first series lies inside the outline of each label of the second series. For example, the labels located on one side of the support tape may have an outline substantially homothetic with that one of the labels located on the other side of the support tape. Thus, when cutting the second film in order to form the second series of labels, the presence of the cut labels in the first film between the blade of the cutting tool and the corresponding backing tool is avoided, so that the risk of damaging the support tape, of insufficiently cutting the perimeter of the labels, or of the adhesive flowing is even further reduced.

As a further variant, the labels located on one side of the support tape may each have at least one edge that is offset from that of the corresponding label located on the opposite side, the offset being greater than the thickness of a cutting blade used to cut the second series of labels. For example, the offset is greater than or equal to about 0.5 mm.

According to another alternate feature, the invention also provides a support obtained according to the above process and which includes first and second series of removable adhesive labels placed on either side of a support tape.

According to yet another alternate feature, the invention also provides a method of continuously supplying a chain of object labels, especially bottle labels, by a support according to the invention. The method includes: in a first feed station, a step of providing a support in the form of a tape, with labels being placed on both faces of the said support. The method further includes a step of driving the support so as to make it pass through a first labeling station fed with the objects, with the labeling of the objects in the first labeling station being carried out using the labels affixed to the first face of the support for example. Further, the support is driven so as to make it pass through a second labeling station, which may or may not be different from the first. The labeling of the objects in the second labeling station can be carried out using the labels affixed to the second face of the support.

For example, on leaving the first labeling station, the support can be wound around a spindle so as to form a roll intended to be positioned in a second feed station, which may or may not be different from the first, in order to feed the second labeling station. As a variant, on leaving the first labeling station, the support can be driven directly to the second labeling station. By way of example, the second labeling station may be fed with objects other than those that have been labeled in the first labeling station. Alternatively, the second labeling station may be fed with the objects that have been labeled during the first pass, so that each of the objects is labeled by means of a label from each of the faces of the support.

As should be apparent, the invention can provide a number of advantageous features and benefits. It is to be understood that, in practicing the invention, an embodiment can be constructed or process performed which includes one or more features or benefits of embodiments disclosed herein, but not others. Accordingly, it is to be understood that the preferred embodiments discussed herein are provided as examples and are not to be construed as limiting, particularly since embodiments can be formed to practice the invention that do not include each of the features of the disclosed examples.

BRIEF DESCRIPTION OF THE DRAWINGS

The invention will be more clearly understood on reading the description that follows and on examining the figures that accompany it. The drawings and described embodiments or examples are presented merely by way of example and should not be construed to limit the invention. In the drawings:

FIG. 4 is a top view of a support according to a first embodiment of the invention;

FIG. 5 is a schematic sectional view of a support according to FIG. 4;

FIG. 6 is a top view of a support according to a second embodiment of the invention;

FIG. 7 is a schematic sectional view of a support according to FIG. 6;

FIG. 8 is a top view of a support according to a third embodiment of the invention; and FIG. 9 is a schematic sectional view of a support according to FIG. 8.

DETAILED DESCRIPTION OF THE PREFERRED EMBODIMENTS

Figure 1:
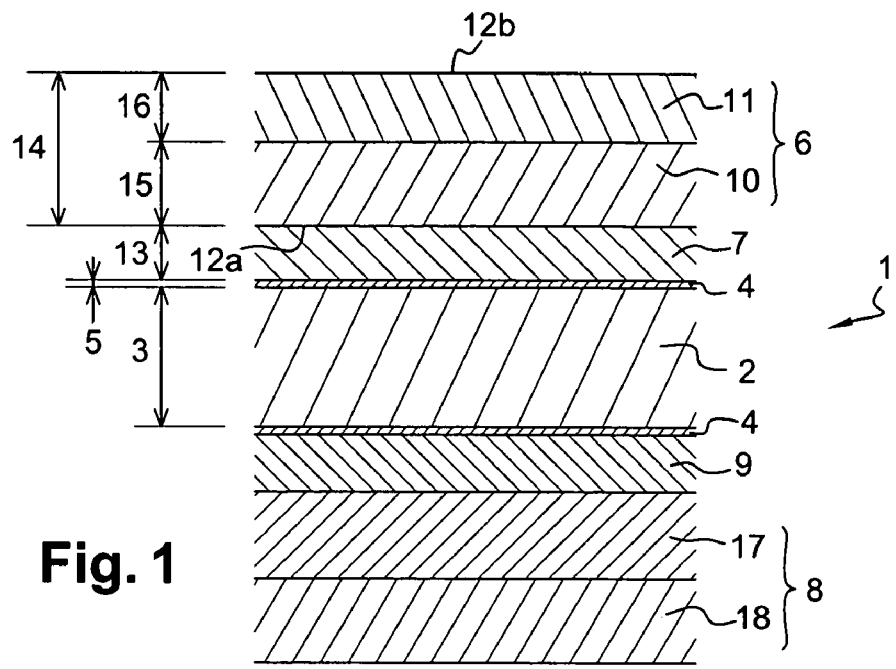
FIG. 1 is a schematic view in cross section of a support according to the invention.

FIG. 1 shows an example of a support 1 according to the invention. This support 1 includes a support tape 2 with a thickness 3 of about 50 µm, for example. This support tape is coated on each of its faces with a layer 4 of a non-stick material, for example a layer of silicone with a thickness 5, for example, of about 1 µm.

A first film 6 is placed on a first side of the support tape 2 and is retained thereon by means of a first adhesive layer 7. A second film 8 is placed on a second side, opposite the first side, and is retained by means of a second adhesive layer 9 on this support tape 2. The adhesive layers 7 and 9 may be identical.

According to the invention, the films can be obtained by coextrusion of at least two layers of different thermoplastics. In the example shown in FIG. 1, the films 6 and 8 each include two layers. However, while still remaining within the scope of the present invention, the films 6 and 8 may comprise different numbers of layers.

In the present case, the first film 6 includes a first layer 10 and a second layer 11. The layers are bonded together, and the joint between the two layers is preferably visible only in sectional view, and by means of a microscope. Preferably, the first layer 10 is made of polypropylene and has a surface 12a in contact with the adhesive layer 7, while the second layer 11 is preferably made of low-density polyethylene and has an upper surface 12b in contact with the air and is intended to serve as a medium for printing an indicium on the label. The lower surface of the second layer 11 is intimately bonded to the upper surface of the first layer 10.

The adhesive layer 7 has a thickness 13 of preferably less than 20 µm, and preferably between 15 and 18 µm. Moreover, the thickness 14 of the first film 6 in this example is about 62 µm, with this thickness being made up as 50 µm by the thickness 15 of the first layer 10 and 12 µm by the thickness 16 of the second layer 11.

Preferably, the films 6 and 8 are identical to each other. In this case, the support tape 2 defines a plane of symmetry, and the second film comprises a first layer 17 such as 10 and a second layer 18 such as 11.

However, while still remaining within the scope of the present invention, the films 6 and 8 may differ from each other. For example, the various layers may be of different thickness and/or made of different materials.

To produce such a support 1, the support tape 2 is initially stored in the form of a reel 19 and is unwound and led into an installation 20 where the first adhesive layer 7 is deposited continuously, for example by spraying it onto this support tape 2. The first film 6 has been formed beforehand by coextrusion using known processes so as to have the at least two layers. The film 6 is initially stored in the form of a reel 21, which is unwound downstream of the support tape 2, in such a way that this film 6 is continuously deposited on and bonded to a first face of the support tape 2.

In a first method of implementation, the support tape 2 provided on one of its faces with a film can be wound around a mandrel so as to form a new reel, and this new reel may be unwound instead of the first reel 19, in such a way that the second film 8 is bonded to the second face of this tape by means of the second adhesive layer 9.

Figure 2:
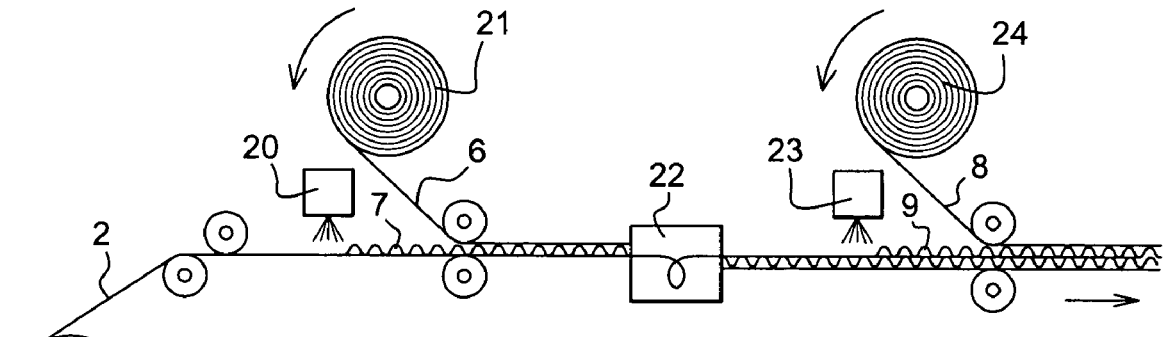
FIG. 2 is a schematic illustration of the production of a support according to the invention.

As a variant, in a complementary and continuous manner, as shown in FIG. 2, the support tape 2 provided with its first film 6 is conveyed through a station 22 in which the tape is turned upside down, in which, by a return roll mechanism, the tape is turned over before being presented beneath a second installation 23 capable of depositing, for example by spraying, the second adhesive layer 9. The second film 8 is formed beforehand by coextrusion using known processes so as to have the at least two layers. The film 8 itself is initially stored in the form of a reel 24. The reel 24 is unwound downstream of the support tape 2, in such a way that this film is continuously deposited on and bonded to this second face of the support tape 2. The support 1 provided with continuous films such as 6 and 8 on each of its two faces is then wound around a mandrel, on which it is stored.

Figure 3:
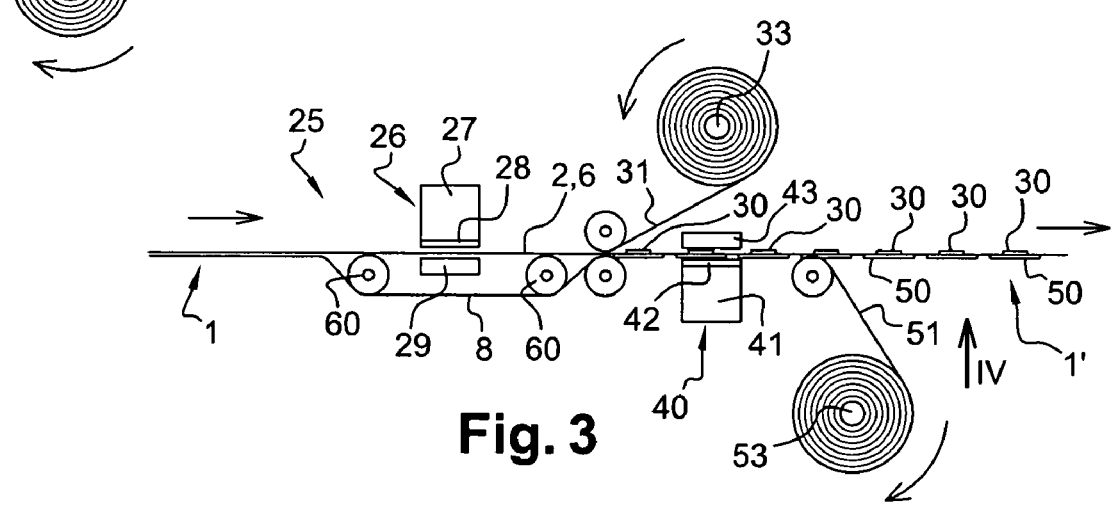
FIG. 3 schematically illustrates the cutting of the labels according to one example implementing the invention.

To produce labels in these films 6 and 8, in accordance with one example of implementing the invention, the support 1 stored in reel form is unwound and, after optional corona treatment and printing of the contents of the labels, is brought to a label cutting installation 25 shown schematically in FIG. 3.

This installation 25 includes a first cutting station 26 intended to cut the first film 6, in order to form a first series of labels 30, and a second cutting station 40 intended to form a second series of labels 50, by cutting the second film 8.

By way of example, the first cutting station 26 can include a cutting tool 27 known per se and shown schematically, which includes a cutting blade 28 having an outline corresponding to that of the label to be produced, and a backing tool 29 intended to bear the pressure exerted by the cutting tool. Similarly, the second cutting station 40 can include a cutting tool 41, having a cutting blade 42, and a backing tool 43.

According to one aspect of the invention, the second adhesive-coated film 8 is temporarily separated from the support tape 2 prior to the cutting of the first adhesive-coated film 6, with this separation being performed for example by means of rotating rollers 60 having a non-stick coating, such as for example a siliconized surface, a Balinite®-type treated steel or a Teflon® coating. Thus, the cutting of the labels 30 on the first film 6 bonded to the support tape 2 may be performed without the second film 8 being interposed between the blade 28 of the cutting tool 27 and the backing tool 29.

After the labels 30 have been cut, the remaining portion 31 of the first adhesive-coated film 6 is removed, by being wound up on a reel 33 for example. The second film 8 rejoins the support tape 2 bearing the labels 30, and then the labels 50 are cut in the cutting station 40. The remaining portion 51 that extends around these labels is then removed, being wound up on a reel 53 for example.

A label support 1' is obtained that can be wound around a mandrel in order to form a reel. The support 1' includes the support tape 2 with, on one of its faces, the first series of labels 30 and, on the opposite face, the second series of labels 50. This support 1' can be used in a continuous labeling process, such as one of those described in one of the French patents by the Applicant FR 2 789 971 or 2 789 972.

According to one advantageous aspect of the invention, the cutting of the labels 50 in the second cutting station 40 may be carried out in such a way that the outline 32 of the labels 30, which is shown by the broken line in FIG. 4, lies inside the outline 52 of the labels 50, preferably with the distance g separating the edges of two superposed labels 30 and 50 being greater than the thickness of the cutting blade 42. This distance g is for example at least 0.5 mm.

Each label 30 may furthermore be centered with respect to the label 50 that is associated therewith, and the labels 30 and 50 may follow one another on each of the faces of the support tape 2 with a uniform spacing.

It will be understood that, during cutting of the labels 50 in the example illustrated in FIGS. 3 and 4, the labels 30 that are cut first are not interposed between the backing tool 43 and the blade 42 of the cutting tool 41 and therefore do not impede the cutting of the labels 50.

The cutting tool 41 may be equipped with at least one sensor (not shown) that allows the cutting of each label 50 to be synchronized with the passage of a label 30 in a predetermined position, in which its outline 32 is entirely contained within that of the label 50 at the point to be cut.

The labels 30 and 50 in FIGS. 4 and 5 are homothetic and centered on each other in such a way that the larger label, in this case here the label 50, has a continuous and regular outline projecting beyond the outline 32 of the label 30 by a band of continuous width of the order of the distance g defined above.

The labels 30 and 50 in FIGS. 6 and 7 can be superposed, but they are arranged in such a way that only the edges of the labels of either one of the series, facing one another along a direction in which the support tape is unwound, are superposed with a label of the other face over at least one portion of the order of the distance g defined above. This is because the labels 30 of one series are respectively centered on the axial spaces 70 that separate two adjacent labels 50 of the second series of labels.

The labels 30 and 50 of FIG. 6 have here substantially trapezoidal cuts and can be printed with different contents. The labels are also placed "head up/head down" relative to the direction in which they are read. In other words, the labels on one side are reversed or oriented 180° compared with the labels on the opposite side with respect to the direction in which the labels are read or with respect to the indicia on the labels. Thus, the tops of the first series of labels and the bottoms of the second series will be adjacent (or closer to) one edge of the support tape, while the bottoms of the first series of labels and the tops of the second series will be closer to the other edge of the support tape. This embodiment is particularly suited to the configuration of a support 1 bearing, on one side, a label intended for the right side of the object to be labeled and, on the other side, a label intended for the reverse side of the same object to be labeled. This is because, after the tape has been turned upside down, and after a first face of the object has been labeled in a first labeling station with the first label, the second label is in the correct configuration relative to the second face of the object to be labeled.

The labels 30 and 50 in FIGS. 8 and 9 are identical, having the same outline and the same printed content. In the example shown, these labels 30 and 50 are rectangles and can also be arranged "head up/head down" with respect to one another.

Throughout the description, expressions such as "including a," "having a," "has," "comprises," "includes," etc. are to be considered as being synonymous with "including at least one," unless otherwise indicated. Similarly, expressions such as "including two" etc. should be construed to mean "including at least two."

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A support for labels, which comprises:
   a support tape having first and second faces;
   first and second series of removable adhesive labels respectively positioned on the first and second faces of the support tape;
   wherein the labels of at least one of the first and second series include at least two coextruded layers of different materials;
   wherein the first series of labels includes a first plurality of labels which are spaced from each other in a longitudinal direction of said support tape with portions of said support tape exposed between adjacent labels of said first plurality of labels;
   wherein said second series of labels includes a second plurality of labels which are spaced from each other in the longitudinal direction of said support tape with portions of said tape exposed between adjacent labels of said second plurality of labels;
   wherein a label of said first plurality has a perimeter at least a portion of which is spaced at least 0.5 mm in the longitudinal direction of said support tape from a perimeter of a label of said second plurality of labels which overlaps said label of said first plurality of labels;
   wherein said label of said first plurality of labels overlaps with two labels of said second plurality of labels, and further wherein at least a portion of said perimeter of said label of said first plurality of labels is spaced from perimeters of both of said two labels of said second plurality of labels; and
   wherein a space between the two labels of said second plurality of labels is occupied by said label of said first plurality of labels on an opposite side of said support tape.

2. A support according to claim 1, wherein the labels are retained by means of an adhesive layer on the first and second faces of the support tape.

3. A support according to claim 1, wherein the labels of the first and second series each include at least two layers of different coextruded materials.

4. A support according to claim 3, wherein the two materials are chosen from the family of polyolefins.

5. A support according to claim 3, wherein one of the at least two coextruded layers of different materials is a polyethylene.

6. A support according to claim 5, wherein the polyethylene is a low density polyethylene.

7. A support according to claim 6, wherein one of the at least two coextruded layers of different materials is a polypropylene.

8. A support according to claim 1, wherein one of the at least two coextruded layers of different materials is a polyethylene.

9. A support according to claim 8, wherein one of the at least two coextruded layers of different materials is a polypropylene.

10. A support according to claim 9, wherein the support tape is made of at least one of a paper material and a thermoplastic material, and wherein the first and second faces of the support tape are coated with a silicone layer.

11. A support according to claim 9, wherein the support tape is made of a material including polyethylene terephthalate.

12. A support according to claim 9, wherein the labels of at least one of the first and second series have a thickness of less than 65 µm.

13. A support according to claim 1, wherein the labels of the first and second series each have a thickness of less than 65 µm.

14. A support according to claim 13, wherein the labels of the first and second series have a thickness of about 62 µm.

15. A support according to claim 1, wherein the labels of said at least one of the first and second series comprise first and second layers which are intimately bonded, the first layer being made of polypropylene and the second layer being made of polyethylene, and wherein the thickness of the first layer is greater than the thickness of the second layer.

16. A support according to claim 15, wherein the first layer has a thickness of approximately 50 μm and the second layer has a thickness of approximately 12 μm.

17. A support according to claim 15, wherein the first layer is in contact with the adhesive layer in order to be retained on the face of the support tape.

18. A support according to claim 1, wherein the support tape has a thickness of between 10 and 40 μm.

19. A support according to claim 1, wherein the support tape has a thickness of between 23 and 36 μm.

20. A support according to claim 1, wherein the label is transparent.

21. A support according to claim 1, wherein a label of the first series is respectively centered on an axial space separating two adjacent labels of the second series of labels.

22. A support according to claim 1, wherein the labels of the first series are respectively centered on the labels of the second series.

23. A support according to claim 1, wherein the labels of the first series are identical to the labels of the second series.

24. A support according to claim 1, wherein the labels of the first series are different from the labels of the second series.

25. A support according to claim 24, wherein the labels of the first series have a different profile than the labels of the second series.

26. A support according to claim 1, wherein the labels of the first series have an outline homothetic with an outline of the labels of the second series.

27. A support according to claim 26, wherein the outline of each label of the first series lies inside the outline of each label of the second series.

28. A support according to claim 1, wherein the outline of each label of the first series lies inside the outline of each label of the second series.

29. A support according to claim 1, wherein the labels of the first series have the same shape as the labels of the second series.

30. A support according to claim 29, wherein the first and second series of labels have indicia thereon, and wherein labels of the first series are rotationally offset with respect to labels of said second series.

31. A support according to claim 1, wherein the first and second series of labels have indicia thereon, and wherein labels of the first series are rotationally offset with respect to labels of said second series.

32. A support according to claim 31, wherein labels of said first series are offset 180° with respect to labels of said second series such that tops of the first series of labels and bottoms of the second series of labels are adjacent a first edge of the support tape, and bottoms of the first series of labels and tops of the second series of labels are adjacent a second edge of the support tape.

33. A support as recited in claim 1, wherein the at least two coextruded layers include a first layer and a second layer, and wherein the first layer is between the second layer and the support tape when the labels are disposed on the support tape, and wherein the first layer has a higher stiffness than the second layer.

34. A support as recited in claim 33, wherein the first layer comprises polypropylene and the second layer comprises polyethylene.

35. A support for labels according to claim 1, wherein the labels of said first plurality of labels have the same shape as labels of said second plurality of labels, and further wherein the labels of said first plurality of labels are rotated 180 degrees with respect to labels of the second plurality of labels.

36. A support for labels, which comprises:

a support tape having first and second faces;

first and second series of removable adhesive labels respectively positioned on the first and second faces of the support tape;

wherein the labels of at least one of the first and second series include at least two coextruded layers of different materials;

wherein the first series of labels includes a first plurality of labels which are spaced from each other in a longitudinal direction of said support tape with portions of said support tape exposed between adjacent labels of said first plurality of labels;

wherein said second series of labels includes a second plurality of labels which are spaced from each other in the longitudinal direction of said support tape with portions of said tape exposed between adjacent labels of said second plurality of labels;

wherein each label of said first plurality of labels overlaps with at least one label of said second plurality of labels; and wherein the perimeter of the label of the first plurality of labels is entirely within the perimeter of the label of the second plurality of labels, and wherein at least a portion of the perimeter of the label of the first plurality of labels is spaced at least 0.5 mm in the longitudinal direction of the support tape from the perimeter of the label of the second plurality of labels.

37. A support for labels, which comprises:

a support tape having first and second faces;

first and second series of removable adhesive labels respectively positioned on the first and second faces of the support tape;

wherein the labels of at least one of the first and second series include at least two coextruded layers of different materials;

wherein the first series of labels includes a first plurality of labels which are spaced from each other in a longitudinal direction of said support tape with portions of said support tape exposed between adjacent labels of said first plurality of labels;

wherein said second series of labels includes a second plurality of labels which are spaced from each other in the longitudinal direction of said support tape with portions of said tape exposed between adjacent labels of said second plurality of labels;

wherein each label of said first plurality of labels overlaps with at least one label of said second plurality of labels;

where in a label of said first plurality of labels has a perimeter at least a portion of which is spaced at least 0.5 mm in the longitudinal direction of the support tape from a perimeter of a label of said second plurality of labels which overlaps said label of said first plurality of labels; and wherein labels of said first plurality of labels are rotated 180 degrees with respect to labels of said second plurality of labels.

* * * * *